May 23, 1961 M. M. BOWMAN, JR 2,985,469
SNAP-FIT PLASTIC PIPE JOINT
Filed Sept. 9, 1957

INVENTOR.
M.M. BOWMAN JR.
BY Hudson & Young
ATTORNEYS

2,985,469
SNAP-FIT PLASTIC PIPE JOINT

Mark M. Bowman, Jr., Bartlesville, Okla., assignor to Phillips Petroleum Company, a corporation of Delaware Filed Sept. 9, 1957, Ser. No. 682,708

5 Claims. (Cl. 285—260)

This invention relates to snap-fit pipe joints wherein the pipe and couplings are made of materials which are substantially rigid, yet slightly yielding. The invention also relates to couplings for joining sections of rubber hose or elastic tubing which are intended for low-pressure service.

Accordingly it is an object of the invention to provide a coupling for flexible, semi-rigid pipe joints which is locked together by pressing the pipe and coupling together.

Another object of the invention is to provide an improved tubing connector assembly which can be used repeatedly in service with materials which are yielding and elastic, such as rubber.

Other and further objects and advantages will be apparent to those skilled in the art upon study of this disclosure, including the attached drawing.

Figures 1, 2:
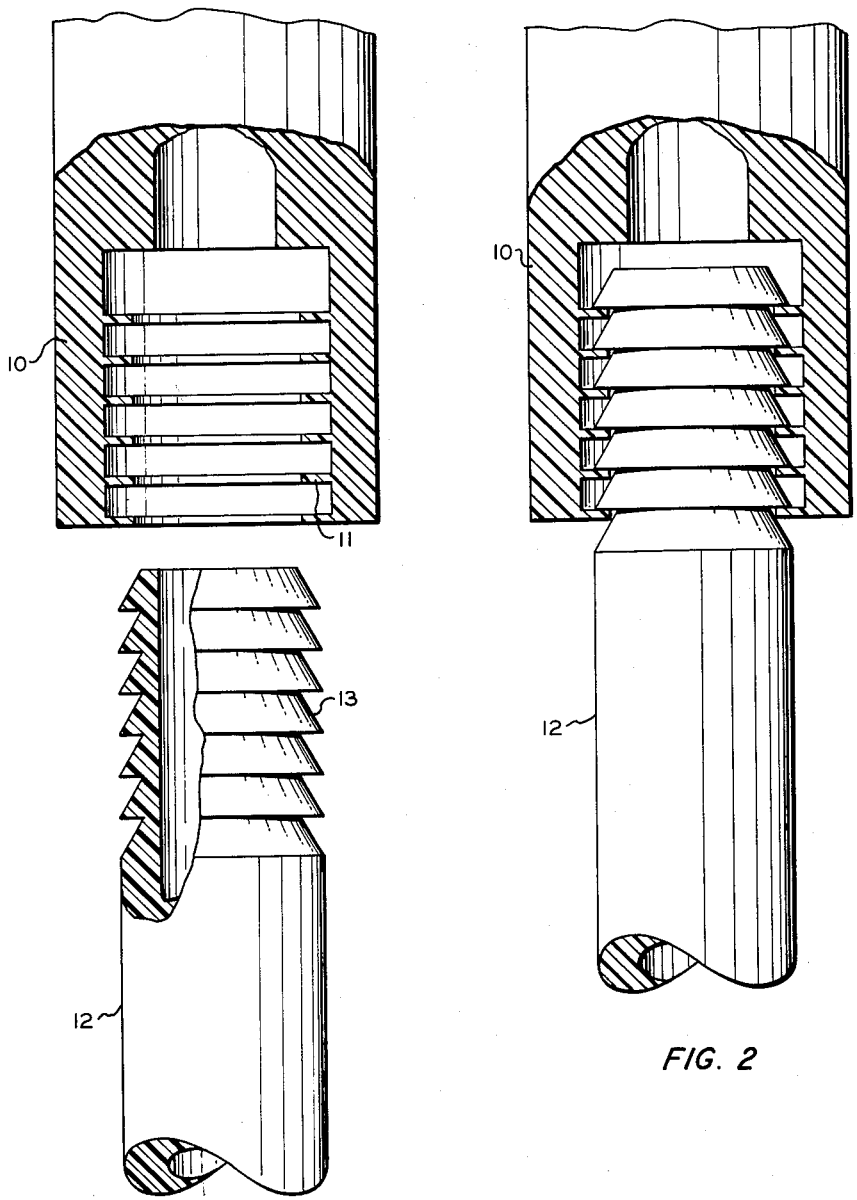
Figure 1 is an elevation view of one end of a pipe joint and a sectional elevation view of one end of a coupling.
Figure 2 represents the completed coupling wherein the parts shown in Figure 1 are connected.

Referring now to the drawing, coupling member 10 has a plurality of continuous, annular fins 11 projecting inwardly from the inner surface of the coupling and these fins are thin and flexible. Pipe 12 is provided at the end with a plurality of continuous, annular beveled taper-lock members 13 the diameter of which is slightly less than the internal diameter of the coupling 10 plus the thickness of the fins 11 so that as the pipe 12 is forced into the coupling 10, the fins 11 will be deflected and stretched to allow passage of the members 13. The members 13 are beveled on the coupling side and are straight on the pipe side. After the members 13 have progressed past the fins 11 the fins will tend to regain, at least in part, their normal position in the coupling thus preventing removal of pipe 13 and the pressure which is exerted in the pipe by the fluid contained therein will tend to press the fins against the members 13 of pipe 12 and to effect a seal.

In some cases it may be desirable to use a plastic cement in making a joint so as to assure obtaining a fluid tight seal.

The shoulders in the coupling prevent the conduit from entering the coupling past the last annular fin.

In the case of extremely flexible materials such as rubber garden hose the connection can be made and broken repeatedly whereas with materials which are more rigid, for example, solid polymers of olefins, the connection once made is substantially permanent because the fins 11 will resist release of the pipe 13 by adhering to the straight edges of the taper-lock members 13 to the extent that the fins will tend to be torn from the coupling before they will release the pipe 12.

The fins 11 in coupling 10 are shown as being substantially perpendicular to the wall of the coupling, however, these fins can be positioned in the coupling slanted in the direction opposite that of the pipe to be joined therewith, to facilitate entrance of the pipe into the connection and the locking members 13 on pipe 12 are shown as having the back edges substantially perpendicular to the walls of the pipe, however, these frusto-conical sections can be recessed so as to provide a more positive contact with the fins 11 in coupling 10.

The joint in this invention is applicable in general to that class of materials referred to as "plastics" which includes polymeric materials such as polyolefins, polyvinylchloride, vinylidene chloride, polyamides and other materials which are substantially rigid yet slightly yielding. Solid polyethylene is a preferred material of construction for use in making the snap-fit joint of the invention. Solid polyethylene manufactured by the low pressure polymerization of ethylene in the presence of a catalyst containing chromium oxide, a substantial portion of which is in the hexavalent form, associated with alumina, zirconia, silica, or thoria and in the presence of a diluent such as cyclohexane, is especially preferred, because the device of this invention takes advantage of the yielding characteristic of the polyethylene in accomplishing the deformation required to effect the joint and takes advantage of the rigidity of the polyethylene in resisting parting of the joint where it is once made.

The frusto-conical sections on the pipe ends can conveniently be formed by being turned on a lathe or with a die or the pipe, with the locking members can be molded. The fins in the coupling can be formed by turning, preferably with a tool to cut away the material in one operation, so as to leave the fins; or the coupling, and fins, can be molded, using a collapsible core mold.

The thickness of the fins in the coupling, in cross-section, will be a function of the rigidity of the material. Relatively rigid materials will require the fins to be thin enough to provide sufficient elasticity so that the fins can be deflected by the locking members on the pipe without shearing the fins from the coupling. Thus for a coupling for 2" pipe wherein the pipe and coupling are made from polyethylene having a crystallinity of about 93 to about 95 the fins would be about $\frac{1}{32}$" thick and would extend inwardly from the interior surface of the coupling about $\frac{1}{8}$" where the pipe wall thickness is at least $\frac{1}{4}$". The height of the fins, from coupling wall to crest of fin, should not be greater than $\frac{1}{2}$ the wall thickness of the pipe. The locking members on the pipe, which comprise a plurality of coaxial, contiguous, frusto-conical sections at the end of the pipe will penetrate no more than $\frac{1}{2}$ the wall thickness of the pipe.

The joint assembly of the invention has been described with reference to joining lengths of pipe or conduit by means of a coupling. It will be apparent to one skilled in the art that conduits can be connected to fittings such as L's, T's, valve bodies, and the like. The flexible fins can be in the conduit member and the locking members can be on the fitting, in which case the conduit will be upset at the ends, i.e., the conduit ends will be enlarged to accommodate the fins.

Reasonable variations and modifications are possible within the scope of the disclosure of the invention as described and illustrated.

That which is claimed is:

1. A joint assembly comprising, in combination, a first cylindrical member of a semi-rigid polymeric material having a longitudinal bore therethrough and an enlarged portion of said bore at one end of said member, said member having a series of spaced annular deformable fins extending less than $\frac{1}{2}$ the wall thickness of a hereinafter named second member radially into said enlarged section of said bore, the thickness of the fins in cross-section being uniform and less than the height of the fin from member wall to crest of fin; and a second cylindrical member of a semi-rigid polymeric material having a longitudinal bore therethrough and having an external radius less than the internal radius of said enlarged portion of said first member by at least the cross-sectional thickness of said fins and greater than the internal radius of said fins, said second member having a series of annular, tapered, grooves in its external surface, penetrating less than ½ the wall thickness of said second member, said grooves corresponding in number and spacing to said annular internal fins and forming a series of contiguous, truncated cones, the bases of which are perpendicular to the longitudinal axis of the bore of the second member and are substantially equal in diameter to that of the second member, the diameter of the truncation of the cones being less than the internal diameter of the fins, whereby said second member can be forced, with the truncation of said cones leading, into the enlarged portion of the bore of said first member so that the cones temporarily deflect the fins in passing and the fins then return to position and hold said first and second members together as a joint.

2. The pipe joint of claim 1 wherein the first and second cylindrical members are fabricated from substantially rigid solid polyethylene.

3. The pipe joint of claim 1 wherein said first member and said second member are sections of pipe.

4. The pipe joint of claim 1 wherein one of said first members and said second member is a fitting and the other member is a section of pipe.

5. A conduit connector assembly comprising a coupling member of a semi-rigid polymeric material having a longitudinal bore therethrough and an enlarged portion of said bore at one end of said member, said member having a series of substantially equally spaced annular flexible fins of uniform thickness extending radially inwardly from the wall of the enlargement of said bore, the height of each fin from member wall to crest of fin being less than ½ the wall thickness of a hereinafter described conduit and the cross-sectional thickness of each fin being less than the height; a conduit member having an external radius less than the internal radius of said enlarged portion of said bore of said coupling by at least the cross-sectional thickness of said fins and greater than internal radius of said fins, said conduit having a series of annular, tapered grooves in its external surface corresponding in number and spacing to said annular fins and forming a series of contiguous, truncated cones, the bases of which are perpendicular to the longitudinal axis of the bore of the conduit and are substantially equal in diameter to the diameter of the conduit, the diameter of the truncation of the cones being less than the internal diameter of the fins, whereby the conduit can be forced into the coupling member with the truncation of the cones leading so that the cones temporarily deflect the fins in passing and the fins then return to position and hold the conduit and coupling together.

References Cited in the file of this patent

UNITED STATES PATENTS

| | | |
|---|---|---|
| 686,061 | Hart | Nov. 5, 1901 |
| 1,867,430 | Wisner | July 12, 1932 |
| 1,985,325 | Nathan | Dec. 25, 1934 |
| 2,304,114 | Moore | Dec. 8, 1942 |
| 2,326,292 | Dorman | Aug. 10, 1943 |
| 2,366,067 | Smith | Dec. 26, 1944 |
| 2,366,814 | Smith | Jan. 9, 1945 |
| 2,507,536 | Goodson | May 16, 1950 |
| 2,755,110 | Jacobs | July 17, 1956 |
| 2,889,582 | Cooper | June 9, 1959 |

FOREIGN PATENTS

| | | |
|---|---|---|
| 85,730 | Germany | Mar. 5, 1896 |
| 521,613 | Italy | Mar. 30, 1955 |